(12) United States Patent
Enevoldsen et al.

(10) Patent No.: US 10,024,308 B2
(45) Date of Patent: Jul. 17, 2018

(54) GUIDING LIGHTNING TO A LIGHTNING RECEPTOR

(71) Applicant: SIEMENS AKTIENGESELLSCHAFT, München (DE)

(72) Inventors: Peder Bay Enevoldsen, Vejle (DK); Kaj Olsen, Riiskov (DK); Karsten Schibsbye, Fredericia (DK)

(73) Assignee: SIEMENS AKTIENGESELLSCHAFT (DE)

( * ) Notice: Subject to any disclaimer, the term of this patent is extended or adjusted under 35 U.S.C. 154(b) by 310 days.

(21) Appl. No.: 14/806,719

(22) Filed: Jul. 23, 2015

(65) Prior Publication Data
US 2016/0138570 A1    May 19, 2016

(30) Foreign Application Priority Data
Nov. 13, 2014  (EP) ..................................... 14193039

(51) Int. Cl.
*F03D 80/30*      (2016.01)
*F03D 1/06*       (2006.01)

(52) U.S. Cl.
CPC ........... *F03D 80/30* (2016.05); *F03D 1/0633* (2013.01); *F05B 2240/122* (2013.01);
(Continued)

(58) Field of Classification Search
CPC ....................................................... F03D 80/30
See application file for complete search history.

(56) References Cited

U.S. PATENT DOCUMENTS

| 2,118,058 A * | 5/1938 | Riley ...................... F02B 19/12 |
| | | 123/263 |
| 3,019,989 A * | 2/1962 | Vonnegut ............... A01G 15/00 |
| | | 239/14.1 |

(Continued)

FOREIGN PATENT DOCUMENTS

| DE | 4440744 A1 * | 5/1996 | ........... F03D 1/0633 |
| EP | 2722522 A1 | 4/2014 | |

(Continued)

OTHER PUBLICATIONS

English translation of DE 4440744.*
(Continued)

*Primary Examiner* — Ninh H Nguyen
*Assistant Examiner* — Topaz L Elliott
(74) *Attorney, Agent, or Firm* — Schmeiser Olsen & Watts LLP

(57) ABSTRACT

A method of guiding lightning to a lightning receptor of a rotor blade for a wind turbine, wherein the method includes the following steps: Generating a vortex of airflow by means of a vortex generator, the vortex generator being located at the surface of the rotor blade; attracting the lightning by the vortex; guiding the lightning to the lightning receptor is provided. Furthermore, the invention relates to a rotor blade for a wind turbine, wherein the rotor blade comprises a vortex generator for generating a vortex of airflow, the vortex generator being located at the surface of the rotor blade, and a lightning receptor for receiving an electrical current from the lightning. The vortex generator and the lightning receptor are arranged such with regard to each other that the lightning is guided to the lightning receptor by the vortex which is generated by the vortex generator.

14 Claims, 4 Drawing Sheets

Figure 1:
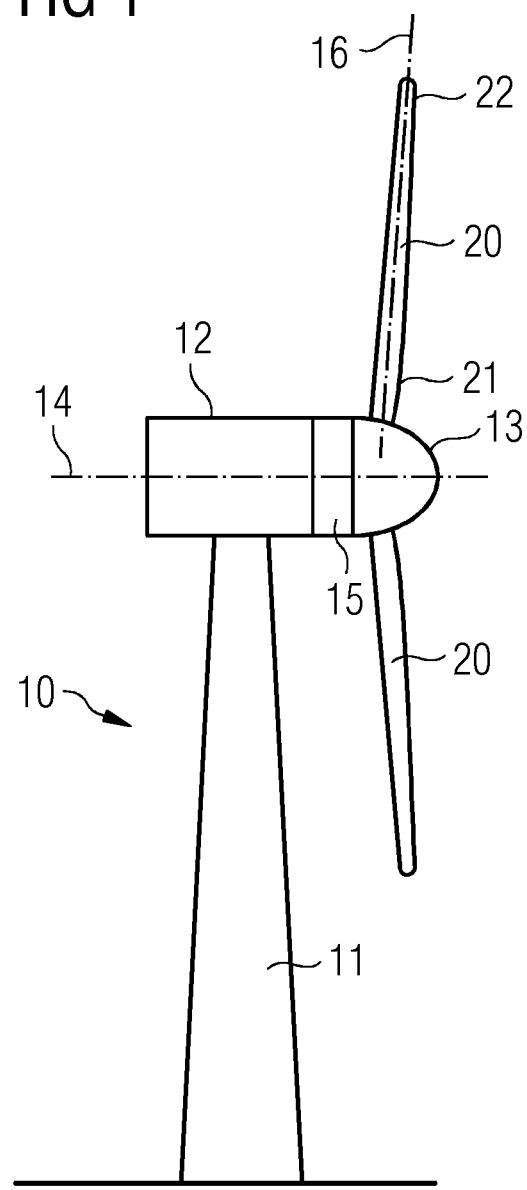

(52) U.S. Cl.
CPC ..... *F05B 2240/221* (2013.01); *F05B 2240/30* (2013.01); *F05B 2260/96* (2013.01); *F05B 2280/1071* (2013.01); *Y02E 10/721* (2013.01)

(56) References Cited

U.S. PATENT DOCUMENTS

| | | | | | |
|---|---|---|---|---|---|
| 3,233,147 | A | * | 2/1966 | Ducati | H05H 1/48 313/161 |
| 4,714,215 | A | * | 12/1987 | Jupp | B64C 23/065 244/199.4 |
| 6,513,761 | B2 | * | 2/2003 | Huenecke | B64C 23/06 244/199.1 |
| 8,047,801 | B2 | * | 11/2011 | Fang | F03D 1/0633 416/235 |
| 2011/0142673 | A1 | * | 6/2011 | Fang | F03D 1/0633 416/241 R |
| 2012/0027594 | A1 | * | 2/2012 | Lewke | F03D 1/0608 416/146 R |
| 2012/0141277 | A1 | * | 6/2012 | Yarbrough | F03D 11/0033 416/146 R |
| 2013/0149162 | A1 | * | 6/2013 | Smith | F03D 1/0633 416/223 R |
| 2013/0195663 | A1 | * | 8/2013 | Hayashi | F03D 11/0033 416/146 R |
| 2013/0280073 | A1 | * | 10/2013 | Erichsen | F03D 1/0675 416/146 R |
| 2014/0112787 | A1 | | 4/2014 | Bracht et al. | |
| 2015/0010407 | A1 | * | 1/2015 | Zamora Rodriguez | F03D 1/0641 416/236 R |
| 2015/0204306 | A1 | * | 7/2015 | Herr | F03D 7/022 416/23 |
| 2016/0017864 | A1 | * | 1/2016 | Grabau | F03D 1/0633 416/235 |
| 2016/0177914 | A1 | * | 6/2016 | Enevoldsen | F03D 1/0633 416/228 |

FOREIGN PATENT DOCUMENTS

| | | |
|---|---|---|
| WO | WO 2007140771 A1 | 12/2007 |
| WO | WO 2010023278 A2 | 3/2010 |
| WO | WO 2012055418 A1 | 5/2012 |

OTHER PUBLICATIONS

European Extended Search Report dated May 8, 2015; Application No. 14193039.6; 7 pgs.
European Examination Report dated Apr. 3, 2018; Application No. 14193039.6; 7 pgs.

* cited by examiner

GUIDING LIGHTNING TO A LIGHTNING RECEPTOR

CROSS-REFERENCE TO RELATED APPLICATIONS

This application claims priority to European Application No. 14193039.6 having a filing date of Nov. 13, 2014, the entire contents of which are hereby incorporated by reference.

FIELD OF TECHNOLOGY

The following relates to a method of guiding lightning to a lightning receptor of a rotor blade for a wind turbine. The following furthermore relates to a rotor blade for a wind turbine with an improved lightning protection arrangement. Furthermore, the following relates to the use of a vortex to attract lightning.

BACKGROUND

Wind turbines are commonly prone to strikes from lightning. On the one hand, this may be caused because the wind turbine is installed at an exposed site which itself is prone to strikes from lightning. On the other hand, the wind turbine as such comprises a considerable extension in vertical direction, i.e. in the direction of the gravitational force of the wind turbine. This extension in vertical direction may be considerably greater than surrounding buildings and/or trees, such that lightning strikes more likely the wind turbine than the buildings and/or trees in the surroundings.

If lightning strikes a wind turbine, often the rotor blades of the wind turbine are hit. This is due to the fact that for horizontal axis wind turbines with at least three rotor blades the tips of the respective rotor blades typically represent the highest points or sections of the wind turbine above the ground. Consequently, the rotor blade, in particular the tip section of the rotor blade, is susceptible and vulnerable to lightning strikes.

In the state of the art lightning protection arrangements often comprise a lightning receptor which is integrated in the shell of the rotor blade and which is connected by an electrically conducting material with a lightning conductor. The lightning conductor is arranged and prepared for transmitting the electrical current from the lightning strike to the ground. Such a conventional lightning receptor is typically made of a material with a high electrical conductivity and has a size of a few centimeters. It might be slightly exposed relative to the surface of the shell of the rotor blade, although from an aerodynamic point of view a complete integration of the lightning receptor into the blade shell is preferred.

A disadvantage of conventional lightning protection arrangements is that despite the presence of a lightning receptor at a prominent and susceptible position on the rotor blade a considerable amount of lightning strikes hits the rotor blade at a distance away from the lightning receptor. This may cause considerable damage to the rotor blade, in particular to the shell of the rotor blade, which might be made of fiber composite material. Damages to the rotor blade due to lightning strikes reach from minor damages which do not need instantaneous repair over more serious damages of the shell of the rotor blade, which need timely repair in order to avoid that water or dust enters the inner structure of the rotor blade, and reach until grave damage of the rotor blade necessitating a shutdown of the wind turbine.

A conventional wind turbine lightning protection system is, for instance, disclosed in the international patent application WO 2012/055418 A1. Therein, a plurality of vortex generators, which are attached on a vortex generator strip, are connected by a conductive band to the receptor of a lightning protection system. This is an improvement compared to the conventional basic system of just having a lightning receptor incorporated into the shell of the rotor blade in so far as the lightning is able to strike any point along the electrically conductive vortex generator strip and is subsequently conducted to the lightning receptor. However, this lightning protection arrangement requires the provision of a vortex generator strip or at least of an electrically conductive band in the vicinity of the lightning receptor. Furthermore, there is still a considerable probability that lightning strikes or hits the rotor blade at a distance away of the conductive band or the vortex generator strip.

Thus, it would be desirable to provide a lightning protection arrangement and a method of avoiding that lightning hits and damages the rotor blade for a wind turbine which is improved compared to the state of the art. Thus, a reduction of the rate of lightning strikes hitting the rotor blade at a distance away of the lightning receptor could be achieved.

SUMMARY

An aspect relates to a method of guiding lightning to a lightning receptor of a rotor blade for a wind turbine wherein the method comprises the following steps:
Generating a vortex of airflow by means of a vortex generator, wherein the vortex generator is located at a surface of the rotor blade;
attracting the lightning by the vortex; and
guiding the lightning to the lightning receptor.

In other words, the aspect discloses a concept how to guide the lightning to the appropriate place on the rotor blade, i.e. the place where the lightning receptor is located. This is achieved by a simple and inexpensive way.

The method benefits from the technical effect that the lightning is preferably attracted by a vortex because of a lower pressure at the center of the vortex. An increased humidity at the center of the vortex is another reason of an increased likeliness of attracting lightning via the vortex. In other words, lightning preferably strikes the rotor blade in a region where vacuum is present. There is no technical vacuum present in the vicinity of the rotor blade. However, there are differences in the air pressure due to the movement of the rotor blade in the air and the aerodynamic shape of the rotor blade. Thus, also in the absence of a technical vacuum the lightning prefers to strike the rotor blade in a region of low pressure.

Thus, it is a key aspect of embodiments of the invention that vortex generators which have been assessed just from an aerodynamic perspective until present might also be used for lightning protection. In the state of the art, vortex generators have been used, for instance, as stall reducing devices or as devices for increasing the efficiency of a rotor blade if the leading edge is soiled. In embodiments of the present invention, it is benefitted of vortices generated by vortex generators in the context of lightning protection. Thus, in the presence of a vortex the lightning is attracted by this vortex and by careful arrangement of the vortex generator and the lightning receptor the lightning is directly guided to the lightning receptor and prevented of hitting the rotor blade elsewhere.

In an embodiment of the invention, the generated vortex is located at the tip section of the rotor blade. The vortex which is generated by the vortex generator has a first rotational direction. A tip vortex which is generated by the shape of the tip section of the rotor blade has a second rotational direction. The first rotational direction and the second rotational direction are substantially equal.

In other words, it is advantageous if the rotational direction of the vortex that is generated by the vortex generator and the rotational direction of the tip vortex that is generated by the tip of the rotor blade correspond to each other. These rotational directions are also referred to as spinning directions. If the two rotational directions match each other the usually smaller vortex generated by the vortex generator merges into the usually larger tip vortex generated by the tip section of the rotor blade. Thus, noise is reduced and efficiency is enhanced.

This is an advantageous embodiment compared to the opposite case of counter rotating vortices of the vortex generator and of the tip section of the rotor blade. Note that tip vortices generated by the tip section of the rotor blade are a commonly known phenomenon of conventional rotor blades. The tip vortices may extend several meters downstream of the tip section in conventional industrial-type wind turbines.

In another embodiment of the invention, the vortex generator is retrofitted to the rotor blade.

Due to the inexpensive and simple setup of the lightning protection arrangement the vortex generator can easily be retrofitted on an existing rotor blade. This rotor blade may also be mounted on a wind turbine and, for instance, be in operation for several years. Thus, embodiments of the invention are cost effective and attractive.

Alternatively, of course, embodiments of the present invention may also be established on newly manufactured rotor blades.

In another embodiment of the invention, the lightning receptor is retrofitted to the rotor blade and the lightning receptor is arranged and prepared for receiving an electrical current from the lightning. The lightning receptor is connected to a lightning conductor for transmitting the electrical current to the ground.

Thus, even if there does not exist any lightning receptor on the rotor blade so far or if there is intended to add another lightning receptor to the rotor blade, this can easily be performed by adding and retrofitting a lightning receptor to the existing rotor blade. Obviously, the lightning receptor has to be connected to a lightning conductor for transmitting the electrical current to the ground. Thus, there is flexibility in retrofitting an existing rotor blade by a vortex generator in order to guide the lightning to the lightning receptor more efficiently and/or to further add and integrate a further lightning receptor as such to the rotor blade.

In another embodiment of the invention, the vortex generator additionally increases the efficiency of the rotor blade, in particular by increasing the lift to drag ratio of the rotor blade.

It is noted that the vortex generator as described so far primarily serves the purpose of generating a vortex for attracting the lightning and guiding the lightning to the lightning receptor. In order to serve this purpose, aerodynamic considerations do not necessarily have to be taken into account. As a consequence, the vortex generator may for instance be designed relatively large. In order to give a concrete example: for a common rotor blade of a wind turbine having a total length of 75 meters, a typical vortex generator for controlling the flow separation and/or in connection with leading edge soiling has a vertical extension of a few millimeters up to one or two centimeters. One reason for this relatively small size is to minimize drag of the vortex generators which often are mounted on the rotor blade in groups of tens of vortex generators.

Compared to these conventional aerodynamic vortex generators the single vortex generator used for attracting the lightning can also have dimensions which are larger than the given numbers above. For example, a vortex generator having a size of a few centimeters may be optimum. This is due to the fact that a vortex generator in the context of a lightning protection arrangement has primarily the task of generating a vortex exhibiting a sufficient size and extension downstream of the place where the vortex generator is positioned.

In summary, it shall be stressed that the vortex generator which is used for guiding the lightning to the lightning receptor may have additionally an aerodynamic purpose but this is not a necessary requirement.

Embodiments of the present invention are also directed towards a rotor blade for a wind turbine, wherein the rotor blade comprises a vortex generator for generating a vortex of airflow, wherein the vortex generator is located at the surface of the rotor blade, and a lightning receptor for receiving and electrical current from the lightning. The vortex generator and the lightning receptor are arranged such with regard to each other that the lightning is guided to the lightning receptor by the vortex which is generated by the vortex generator.

In other words, embodiments of the invention are directed towards a rotor blade for a wind turbine wherein the rotor blade comprises a vortex generator for generating a vortex of airflow and a lightning receptor, wherein the vortex generator and the lightning receptor are arranged such with regard to each other that the lightning is guided to the lightning receptor by the vortex which is generated by the vortex generator.

In particular, embodiments of the present invention are related to a rotor blade of a wind turbine.

Note that features and modifications that are described in relation to the method of guiding lightning to a lightning receptor for a wind turbine also apply to a rotor blade for a wind turbine as such and vice versa.

In an embodiment of the invention, the rotor blade is configured such that the lightning receptor is connected to a lightning conductor for transmitting the electrical current to the ground.

There exists different ways and methods of realizing the conduction of the lightning received at the lightning receptor to the ground where the wind turbine is mounted on. The person skilled in the art will know or will at least be able to inform himself how, for example, the lightning is transmitted from the rotor blade to the hub, from the rotating hub to the stationary nacelle and from the nacelle via the yaw bearing and the tower to the ground.

In another advantageous embodiment, the lightning receptor is located downstream of the vortex generator.

As the vortex mainly or exclusively builds up downstream of the position where the vortex generator is placed, it is beneficial if the lightning receptor is placed downstream of the vortex generator. By this measure, it is ensured that the lightning which is attracted by the vortex, passes by the lightning receptor and does not have to travel along certain distances on the surface of the rotor blade.

In another advantageous embodiment, the vortex generator is located at the suction side of the rotor blade.

Note that in principle the placement of the vortex generator and the lightning receptor are possible on both sides, the pressure side and the suction side of the rotor blade. In some cases, it might even be advantageous to have such lightning protection arrangements on both sides. However, typically, the majority of strikes are striking the rotor blade at the suction side of the rotor blade. Thus, positioning of the vortex generator and the lightning receptor on the suction side is advantageous. Note that in the case of a rotor blade equipped with a winglet at the tip section, wherein the winglet is bent in a large angle exceeding sixty or seventy degrees, it is preferred that a lightning protection system comprising a lightning receptor and a vortex generator is placed on both sides, i.e. the pressure side and the suction side of the winglet. An advantage of having a vortex generator on each side of the rotor blade is that the vortices generated by the vortex generators might advantageously merge into one bigger vortex behind the trailing edge and subsequently are able to merge into the even bigger tip vortex generated by the tip section of the rotor blade.

In another advantageous embodiment, the vortex generator and the lightning receptor are closely spaced to each other.

In particular, the distance between the vortex generator and the lightning receptor is smaller than fifty centimeters, even smaller than five centimeters.

In other words, it is advantageous if the vortex generator is in close vicinity of the lightning receptor. As one main object of embodiments of the present invention is to reduce the rate of lightning strikes hitting the rotor blade at a distance away of the lightning receptor it is crucial to guide the lightning closely across the lightning receptor; thus a small distance between the lightning receptor and the vortex generator is preferably.

It shall be stressed that the given values of preferably smaller than fifty centimeters, in particular smaller than five centimeters, relate to standard rotor blades of a wind turbine reaching having between fifty to eighty meters of length. For a rotor blade which length is deviating from these standard ranges a longer or smaller distance could be preferable. It could also be stated that the distance between the vortex generator and the lightning receptor is preferably smaller than five percent of the chord length at the spanwise position of the lightning receptor, in particular smaller than two percent of the chord length at the given spanwise position.

In another advantageous embodiment, the vortex generator and the lightning receptor are connected by an electrically conductive material. This additional connection might enhance the probability that the lightning which is attracted by the vortex is eventually received by the lightning receptor.

Note, however, that this embodiment deviates from the state of the art in that the lightning is attracted and guided by the vortex of the vortex generator, which is not the case and which is not disclosed in the prior art.

Yet in another embodiment of the invention, the vortex generator is arranged on top of the lightning receptor.

The vortex generator can be placed directly on top of the lightning receptor. Alternatively, there may also be some intermediate layers such as a vortex generator strip or base which is common if a plurality of vortex generator pairs are mounted on a rotor blade of a wind turbine. In the case of a vortex generator that is placed on top of the lightning receptor it is particularly advantageous if the vortex generator itself is made of an electrically conductive material such as for example stainless steel.

The vortex generator may be attached to the lightning receptor by welding, for example spot welding. Alternative electrically conductive materials apart from stainless steel is, for example aluminum, copper, carbon or an alloy such as brass.

Note that the vortex generator may be fastened to the lightning receptor after the lightning receptor has been incorporated to the shell of the rotor blade. This can be done on a newly fabricated rotor blade or it can be retrofitted on an already mounted rotor blade of a wind turbine.

Obviously, if the lightning protection arrangement is placed on a newly fabricated rotor blade, automation e.g. by a robot is advantageous.

Finally, embodiments of the invention are also directed towards the use of a vortex to attract lightning. The vortex is generated by a vortex generator, which is located at the surface of a rotor blade for a wind turbine, and the lightning is subsequently guided to a lightning receptor by the vortex.

As it has been described already, in the state of the art, vortex generators are only known as aerodynamic devices. In this context, the vortices generated by the vortex generator serve the purpose of for example reenergizing the boundary layer of the rotor blade in order to postpone stall to higher angles of attack. Also in the context of a leading edge soiling, e.g. by dirt, dust or insects, vortex generators have a positive impact on the efficiency of the rotor blade.

It is a key concept of embodiments of the invention to use a vortex to attract lightning. By explaining in detail the method of guiding the lightning to the lightning receptor and by disclosing a rotor blade which is provided with a lightning protection system it has been shown and disclosed how a vortex can be used to attract lightning.

BRIEF DESCRIPTION

Figure 2:
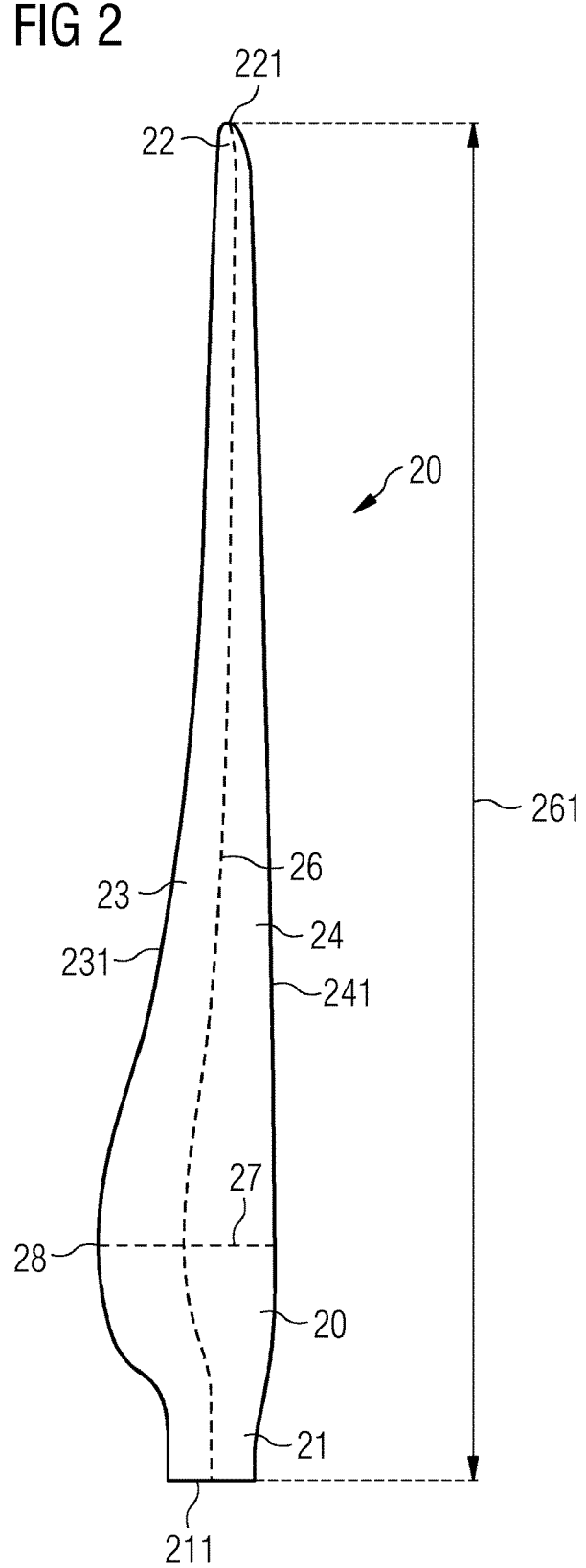
Figure 3:
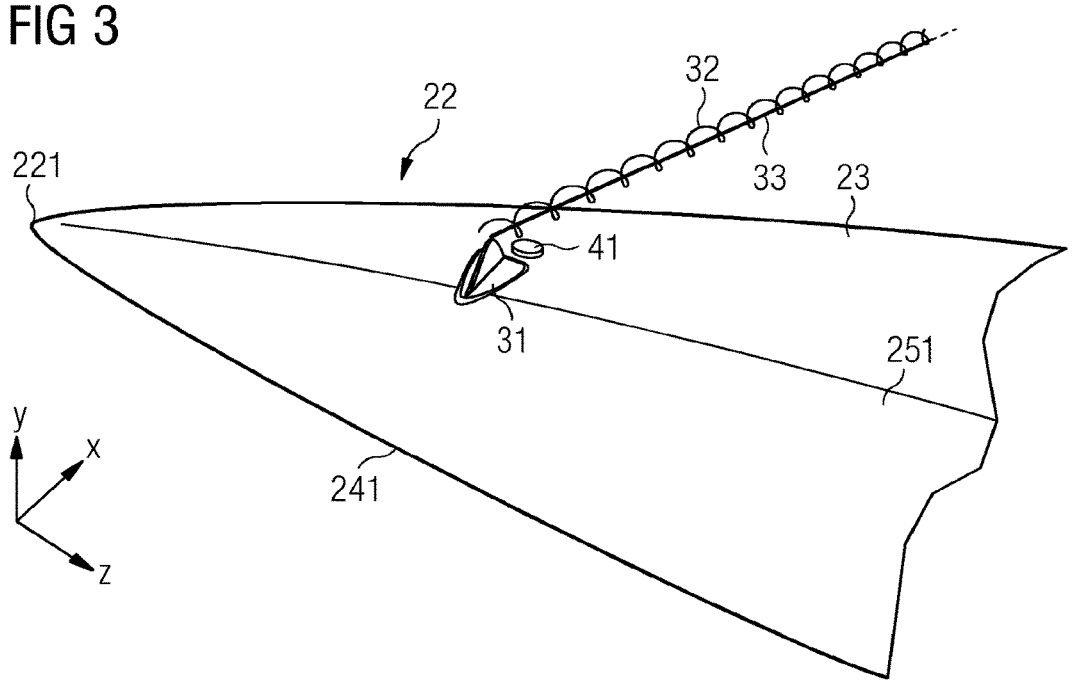
Figure 4:
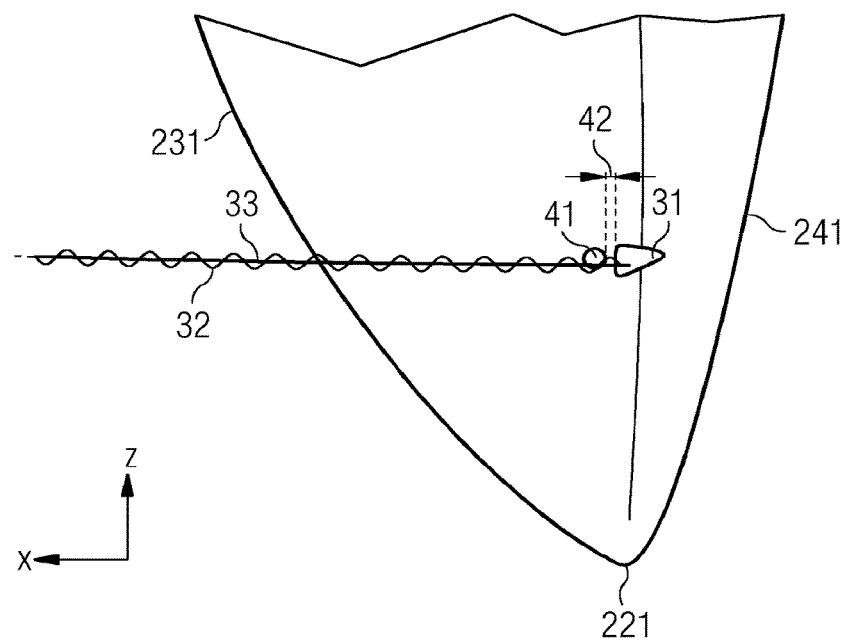
Figure 5:
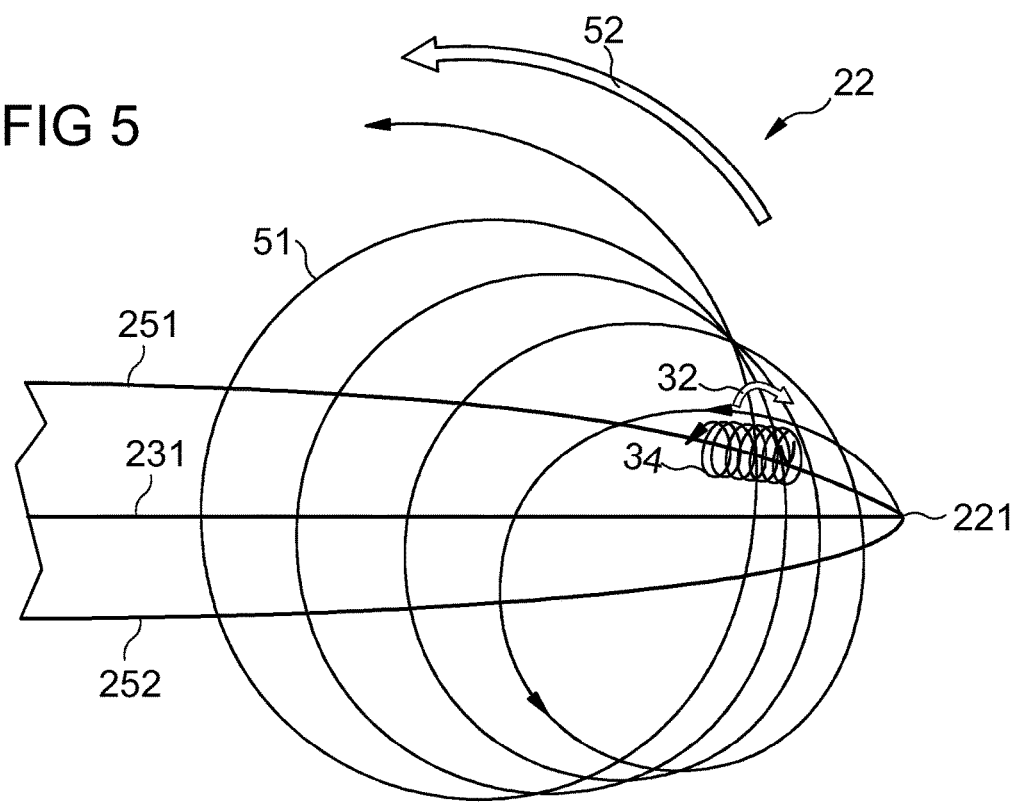

Some of the embodiments will be described in detail, with reference to the following figures, wherein like designations denote like members, wherein:

FIG. 1 shows a wind turbine;
FIG. 2 shows a rotor blade of a wind turbine;
FIG. 3 shows a tip section of a rotor blade provided with a vortex generator and a lightning receptor;
FIG. 4 shows the same tip section of the rotor blade as FIG. 3 in another perspective; and
FIG. 5 shows a vortex generated by a vortex generator and a tip vortex generated by the tip section of a rotor blade.

DETAILED DESCRIPTION

The illustration in the drawings is in schematic form. It is noted that in different figures, similar or identical elements may be provided with the same reference signs.

In FIG. 1, a wind turbine 10 is shown. The wind turbine 10 comprises a nacelle 12 and a tower 11. The nacelle 12 is mounted at the top of the tower 11. The nacelle 12 is mounted rotatable with regard to the tower 11 by means of a yaw bearing. The axis of rotation of the nacelle 12 with regard to the tower 11 is referred to as the yaw axis.

The wind turbine 10 also comprises a hub 13 with three rotor blades 20 (of which two rotor blades 20 are depicted in FIG. 1). The hub 13 is mounted rotatable with regard to the nacelle 12 by means of a main bearing. The hub 13 is mounted rotatable about a rotor axis of rotation 14. Each rotor blade 20 has a longitudinal axis 16.

The wind turbine 10 furthermore comprises a main shaft, which connects the hub 13 with a rotor of a generator 15. The hub 13 is connected directly to the rotor, thus the wind turbine 10 is referred to as a gearless, direct driven wind turbine. As an alternative, the hub 13 may also be connected to the rotor via a gearbox. This type of wind turbine is referred to as a geared wind turbine.

The generator 15 is accommodated within the nacelle 12. It comprises the rotor and a stator. The generator 15 is arranged and prepared for converting the rotational energy from the rotor into electrical energy.

FIG. 2 shows a rotor blade 20 of a wind turbine. The rotor blade 20 comprises a root section 21 with a root 211 and a tip section 22 with a tip 221. The rotor blade 20 has a length 261 that extends from the root 211 to the tip 221. The root 211 and the tip 221 are virtually connected by the span 26 which follows the shape of the rotor blade 20. If the rotor blade were a rectangular shaped object, the span 26 would be a straight line. However, as the rotor blade 20 features a varying thickness, the span 26 is slightly curved or bent as well. Note that if the rotor blade 20 was bent itself, then the span 26 would be bent, too.

The rotor blade 20 furthermore comprises a leading edge section 24 with a leading edge 241 and a trailing edge section 23 with a trailing edge 231.

The trailing edge section 23 surrounds the trailing edge 231. Likewise, the leading edge section 24 surrounds the leading edge 241.

At each spanwise position, a chord line 27 which connects the leading edge 241 with the trailing edge 231 can be defined. Note that the chord line 27 is perpendicular to the span 26. The shoulder 28 is defined in the region where the chord line comprises a maximum chord length.

Furthermore, the rotor blade 20 can be divided into an inboard section which comprises the half of the rotor blade 20 adjacent to the root section 21 and an outboard section which comprises the half of the rotor blade 20 which is adjacent to the tip section 22.

FIG. 3 shows a tip section 22 of a rotor blade. The tip section 22 comprises a suction side 251 and a pressure side 252 (the latter is not directly visible on FIG. 3). Furthermore, the rotor blade comprises a leading edge 241, and, opposite to the leading edge 241, a trailing edge 231. On the suction side 251 a vortex generator 31 and a lightning receptor 41 is mounted. The vortex generator 31 is spaced apart in close vicinity to the lightning receptor 41. If airflow is flowing from the leading edge 241 to the trailing edge 231 a vortex 32 is generated by the vortex generator 31. A vortex 32 is also referred to as a spiral. In any case, a rotational direction and an axis of rotation 33 can be attributed to the vortex 32.

FIG. 4 shows the same embodiment as FIG. 3, but seen from a different perspective. While FIG. 3 shows the tip section 22 of the rotor blade in a perspective view from the leading edge 241, FIG. 4 shows the tip section 22 of the rotor blade in a top view onto the suction side 251 of the rotor blade. In this top view, the distance 42 between the vortex generator 31 and the lightning receptor 41 can be distinguished.

In the concrete example of FIGS. 3 and 4 the chord length of the rotor blade at the spanwise position of the vortex generator 31 is about seventy centimeters. In this context it is noted that the distance 42 between the lightning receptor 41 and the vortex generator 31 is only two centimeters. This ensures that the lightning that is guided from the fading end of the vortex until the source of the vortex, i.e. the vortex generator itself 31, is guided to the vortex generator 31 and passes directly by the lightning receptor 41. There it is conducted to the lightning conductor and subsequently conducted to the ground.

FIG. 5 gives another embodiment of a tip section 22 of a rotor blade. In this Figure, the tip section 22 is viewed from the trailing edge 231. In other words, as the rotor blade is arranged and prepared such that the airflow is flowing from the leading edge section to the trailing edge section, the rotor blade of FIG. 5 is viewed from a downstream perspective. Again, in FIG. 5 a vortex generator 31 can be distinguished. Even more prominent as the vortex generator itself 31 is the vortex 32 that is generated by the vortex generator 31. It can also be seen that the vortex has a first rotational direction 31 in a counter-clockwise sense.

The rotor blade comprises a tip 221. If airflow flows across the rotor blade, a tip vortex 51 is generated at the tip 221. The tip vortex 51 has an impact on the air pressure downstream of the rotor blade. This impact is measurable several meters downstream of the rotor blade under typical operating conditions. A second rotational direction 52 can be attributed to the tip vortex 51. In the example of FIG. 5, the second rotational direction 52 of the tip vortex 51 is counter-clockwise. This is advantageous as by this measure the smaller vortex 32 and the larger tip vortex 51 merge together and do not cause any additional noise, which might create further vortices.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of guiding lightning to a lightning receptor of a rotor blade for a wind turbine, wherein the method comprises the following steps:
   providing a suction side vortex generator located on a suction side of the wind turbine rotor blade,
   providing a pressure side vortex generator located on a pressure side of the wind turbine rotor blade and wherein rotation of the wind turbine rotor blade produces a vortex produced by the suction side vortex generator and a vortex produced by the pressure side vortex generator and wherein the suction side vortex and the pressure side vortex rotate in the same direction and merge to form a merged vortex,
   generating the merged vortex by rotating the wind turbine rotor blade,
   attracting the lightning by the merged vortex, and
   guiding the lightning to the lightning receptor via the merged vortex.

2. The method according to claim 1, wherein
   the vortex generated by the suction side vortex generator has a first rotational direction,
   and further comprising a tip vortex is generated by the shape of the tip section of the rotor blade has a second rotational direction, and
   the first rotational direction and the second rotational direction are substantially the same.

3. The method according to claim 1, wherein the suction side vortex generator is retrofitted to the rotor blade.

4. The method according to claim 1, wherein
   the lightning receptor is retrofitted to the rotor blade,
   the lightning receptor is arranged and prepared for receiving an electrical current from the lightning, and
   the lightning receptor is connected to a lightning conductor for transmitting the electrical current to the ground.

5. The method according to claim 1, wherein the suction side vortex generator additionally increases the efficiency of the rotor blade by increasing the lift to drag ratio of the rotor blade.

6. A rotor blade for a wind turbine, wherein the rotor blade comprises:
- a suction side vortex generator located on a suction side of the rotor blade for producing a suction side vortex,
- a pressure side vortex generator located on a pressure side of the rotor blade for producing a pressure side vortex,
- wherein rotation of the rotor blade produces the suction side vortex and the pressure side vortex that rotate in the same direction and merge to form a merged vortex,
- a lightning receptor for receiving an electrical current from lightning, wherein the lightning receptor is arranged such that the lightning is guided to the lightning receptor by the merged vortex.

7. The rotor blade according to claim 6, wherein the lightning receptor is connected to a lightning conductor for transmitting the electrical current to the ground.

8. The rotor blade according to claim 6, wherein the lightning receptor is located downstream of the suction side vortex generator.

9. The rotor blade according to claim 6, wherein the suction side vortex generator and the lightning receptor are closely spaced to each other.

10. The rotor blade according to claim 6, wherein the distance between the suction side vortex generator and the lightning receptor is smaller than fifty centimeters.

11. The rotor blade according to claim 6, wherein the suction side vortex generator comprises an electrically conducting material.

12. The rotor blade according to claim 6, wherein the suction side vortex generator and the lightning receptor are connected by an electrically conducting material.

13. The rotor blade according to claim 6, wherein the suction side vortex generator is arranged on top of the lightning receptor.

14. A method of attracting lightning with a vortex, comprising:
- rotating a wind turbine rotor blade to generate:
  - a tip vortex,
  - a suction side vortex via a vortex generator located on a suction side of the wind turbine rotor blade,
  - a pressure side vortex via a vortex generator located on a pressure side of the wind turbine rotor blade,
- wherein the tip vortex, the suction side vortex, and the pressure vortex rotate in the same direction and merge to form a merged vortex, and
- guiding lightning to a lightning receptor via the merged vortex.

* * * * *